No. 827,042. PATENTED JULY 24, 1906.
J. B. SECOR.
TYPE WRITER CARRIAGE.
APPLICATION FILED DEC. 20, 1904.

3 SHEETS—SHEET 1.

Witnesses

Jerome B. Secor
Inventor
By his Attorneys

No. 827,042. PATENTED JULY 24, 1906.
J. B. SECOR.
TYPE WRITER CARRIAGE.
APPLICATION FILED DEC. 20, 1904.

3 SHEETS—SHEET 3.

Witnesses

Jerome B Secor
Inventor
By his Attorney

UNITED STATES PATENT OFFICE.

JEROME B. SECOR, OF DERBY, CONNECTICUT, ASSIGNOR TO THE WILLIAMS TYPEWRITER COMPANY, OF DERBY, CONNECTICUT, A CORPORATION OF IOWA.

TYPE-WRITER CARRIAGE.

No. 827,042.  Specification of Letters Patent.  Patented July 24, 1906.

Original application filed September 7, 1904, Serial No. 223,578. Divided and this application filed December 20, 1904. Serial No. 237,684.

*To all whom it may concern:*

Be it known that I, JEROME B. SECOR, a citizen of the United States, and a resident of Derby, in the county of New Haven and State of Connecticut, have invented a new and useful Improvement in Type-Writer Carriages, of which the following is a specification.

My invention relates to paper-guides for type-writer carriages and means for retaining the paper in proper contact with the platen during the printing operation.

The improvements consist particularly in means hereinafter described and claimed for guiding the paper thereon and means for retracting said clips when a new sheet is to be introduced.

Figure 1:
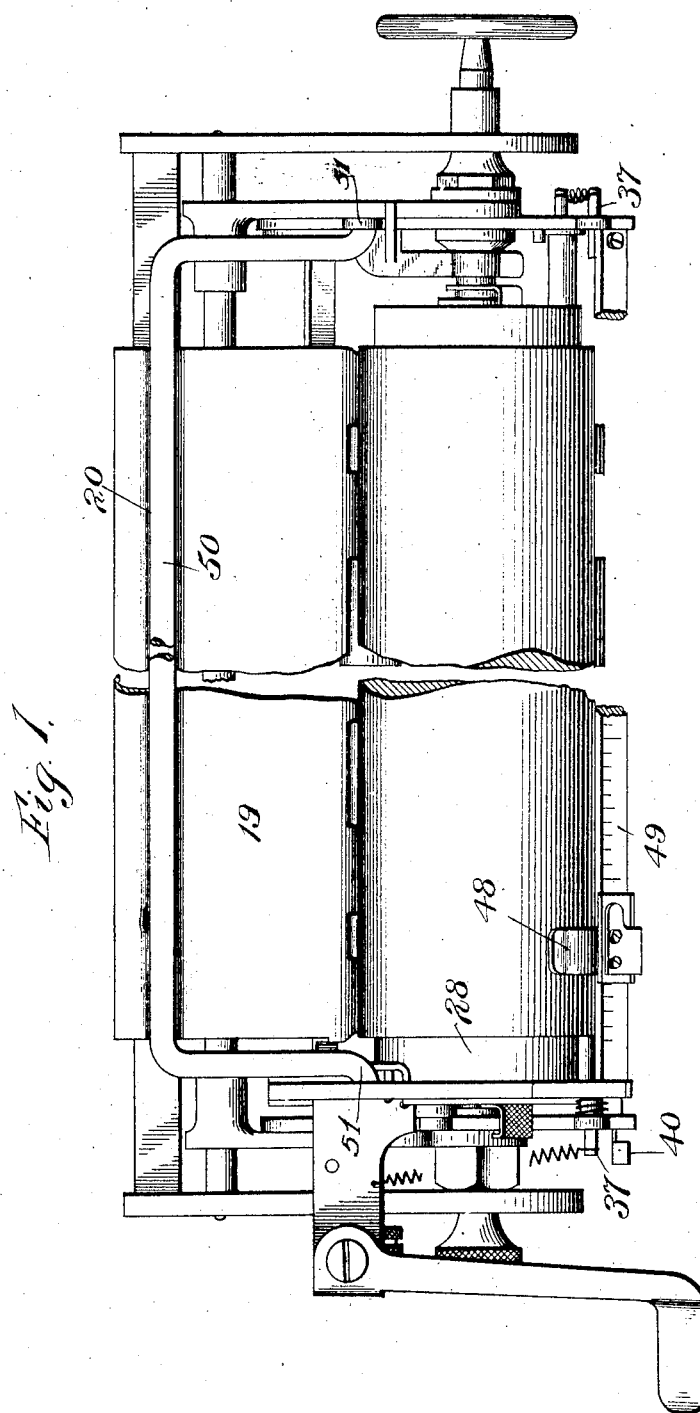
Figure 2:
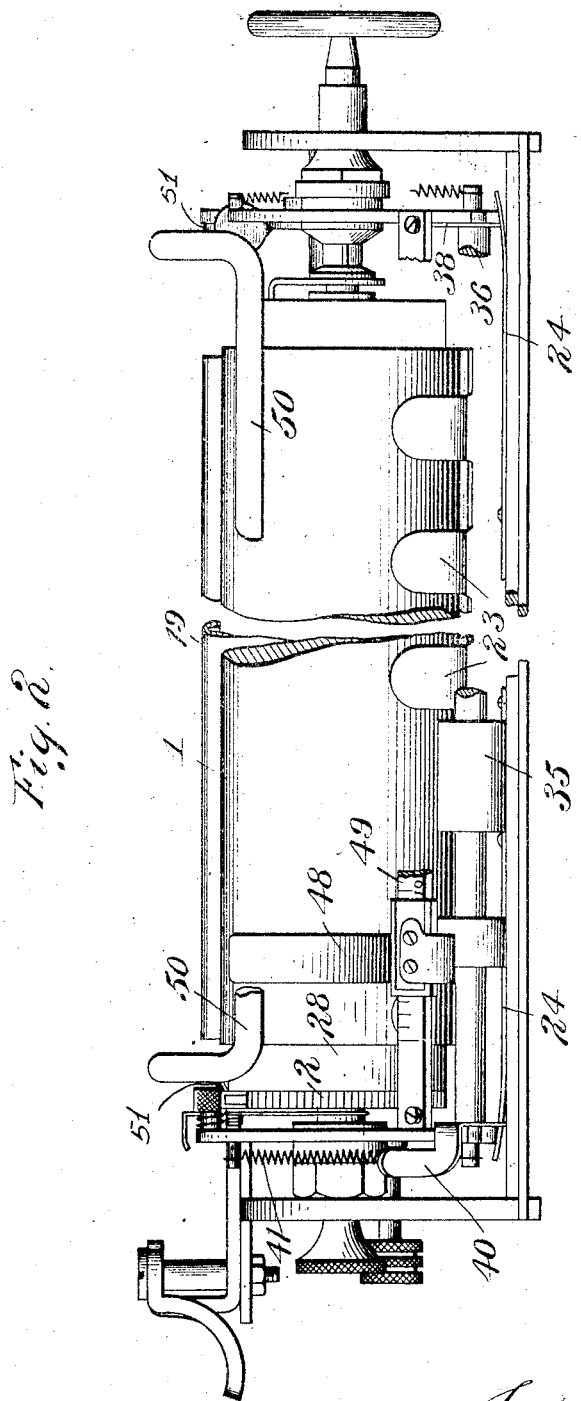
Figure 3:
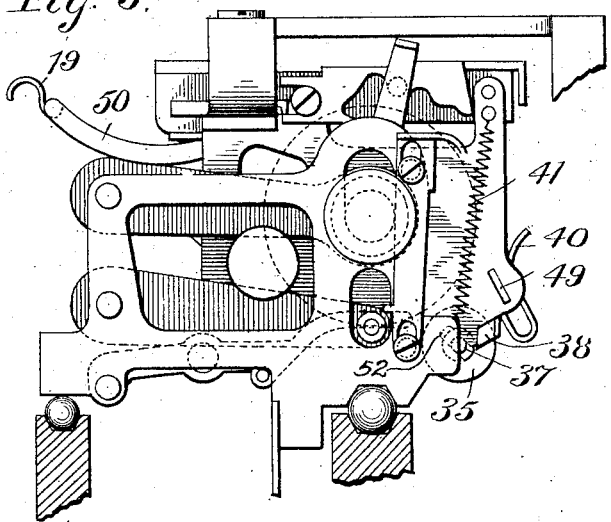
Figure 4:
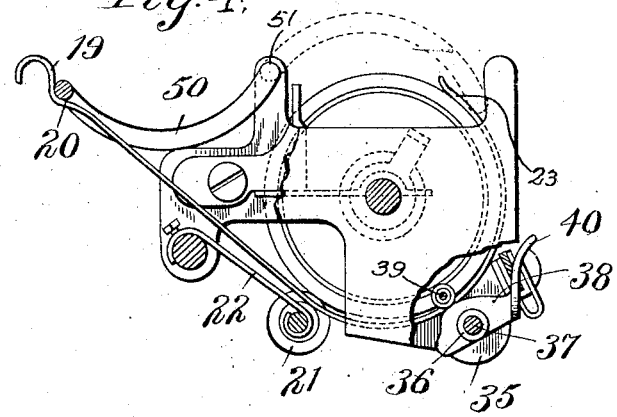
Figure 5:
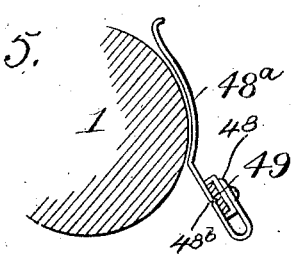

In the accompanying drawings, Figure 1 is a plan view of a type-writer-carriage illustrating my invention, showing a paper-holding bail, hereinafter described, thrown back for the introduction of a fresh sheet. Fig. 2 is a front view of the same, showing the paper-holding bail in operative position. Fig. 3 is an end view of the carriage. Fig. 4 is an end view, partly in section, showing the paper-holding bail thrown back as in Fig. 1. Fig. 5 is a detail end view of an elastic margin or column gage or indicator, showing in section the horizontal bar on which it is mounted and slides.

1 represents the cylindrical platen, and 2 a ratchet gear-wheel mounted on its end as a means for communicating step-by-step rotation to the platen for line-spacing. The platen-operating mechanism being fully described in my application Serial No. 223,578, of which the present is a division, need not be described in detail here.

19 represents the paper-guide table, which is formed with a longitudinal recess 20 for a purpose hereinafter described.

21 represents rollers mounted on springs 22, pressing the paper against the platen to effect the feed of the paper by rotation of the platen. On the front edge of the table are paper-guide clips 23.

The platen and guide-table are mounted in a vertically-movable frame to effect the shift of the platen, as customary with front-strike machines, so as to print either one of two types carried by each type-bar. In order to reduce the power required to thus raise the platen and its accessories, the weight of the vertically-shifting frame and parts carried thereby is partially counterbalanced by springs 24.

35 represents pressure-rollers at front of the platen carried by hollow shaft 36, turning on an inner shaft 37, on the ends of which are keyed cams 38, bearing against antifriction-rollers 39, turning on fixed studs. One of the cams 38 is provided with a projecting finger-piece 40, the depression of which turns the inner shaft 37 and its end cams 38 so as to retract the rollers 35 from the platen, against which they are normally held by springs 41, the shaft 36 sliding at its ends in a direction radial to the platen in inclined slots 52 (shown in dotted lines, Fig. 3) in the end plates of the platen-frame.

48 represents elastic margin or column gages or indicators composed of a slide-rest 48 and a guide-finger 48$^a$, of spring metal, mounted on the rest 48, bent downwardly and upwardly into U shape and curved to avoid the platen. The slide-rest 48 is mounted to slide longitudinally of the platen on the horizontal scale-bar 49 and is held against accidental displacement on said scale-bar 49 by means of pressure of the finger 48$^a$ against the under side of the scale-bar 49. To insure proper degree of pressure or friction of finger 48$^a$ against bar 49, finger 48$^a$ is formed with a nose or lug 48$^b$, which engages the bar 49.

50 represents a supplemental clip comprising a bail pivoted by the ends of its arms at 51 in the platen-frame and resting within the recess 20 in the paper-feed table when turned back out of use, as shown in Fig. 1 and Fig. 3 and in full lines in Fig. 5. Its use is to hold very stiff paper to the platen, for which purpose it is turned forward over the paper to the position shown in Fig. 2 and in dotted lines in Fig. 5. In ordinary cases and with common flexible paper the paper-guides 23 alone suffice for this function.

Having thus described my invention, the following is what I claim as new therein and desire to secure by Letters Patent:

1. The combination of a rotatable platen, a paper-feed table having a longitudinal recess parallel with the rotatable platen, suitable clips by which the paper passing from said feed-table is guided and held in contact with the platen and a supplemental paper-clip adapted for optional use or disuse during the printing operation and retractable when out of use into the recess in the feed-table, substantially as described.

2. In a type-writing machine, the combination of a rotatable platen, a recessed paper-guide table provided with suitable guides to keep the paper in proper contact with the platen, and a supplemental paper-clip for emergency use adapted to apply additional pressure to the paper and capable of being retracted within a recess in the paper-guide table when not in use, substantially as set forth.

3. In a type-writing machine, the combination with a platen and a platen-frame, of a transversely-movable shaft mounted in slots in said frame, pressure-rollers mounted on said shaft, springs for holding said shaft toward said platen to maintain the rollers against the surface of the platen, a hand-operated cam mounted on said shaft and engaging the platen-frame to separate the rollers from the surface of the platen.

4. In a type-writing machine, the combination with a platen and a platen-frame, of a shaft movable transversely to its axis, pressure-rollers mounted on said shaft and adapted to rest against the surface of the platen; a cam on said shaft adapted to engage the platen-frame, to separate the rollers from the surface of the platen and spring means resisting the action of said cam.

5. In a type-writing machine, the combination with a platen and a platen-frame, of a spring-controlled shaft, pressure-rollers mounted on said shaft and adapted to engage the surface of said platen, a cam mounted on said shaft and adapted to force the rollers from the surface of the platen and an antifriction-roller mounted on the frame in engagement with said cam.

6. In a type-writing machine, the combination with a platen and a platen-frame, a spring-controlled shaft movably mounted in said frame, a hollow shaft on said spring-controlled shaft, pressure-rollers carried by said hollow shaft and adapted to bear against the surface of the platen and antifriction-cam means for forcing said shaft away from the platen in opposition to said spring-controlling means to carry the rollers away from the surface of the platen.

JEROME B. SECOR.

Witnesses:
  J. P. CLARKE,
  CHAS. E. BEARDSLEY.